United States Patent
Tien et al.

(10) Patent No.: US 10,846,188 B2
(45) Date of Patent: Nov. 24, 2020

(54) DEVICE AND METHOD FOR PRODUCING TEST DATA

(71) Applicant: Institute For Information Industry, Taipei (TW)

(72) Inventors: Chia-Wei Tien, Taipei (TW); Pei-Yi Lin, Taipei (TW); Chin-Wei Tien, Taipei (TW)

(73) Assignee: Institute For Information Industry, Taipei (TW)

( * ) Notice: Subject to any disclaimer, the term of this patent is extended or adjusted under 35 U.S.C. 154(b) by 146 days.

(21) Appl. No.: 16/207,033

(22) Filed: Nov. 30, 2018

(65) Prior Publication Data
US 2020/0142794 A1    May 7, 2020

(30) Foreign Application Priority Data

Nov. 5, 2018    (TW) .............................. 107139177 A

(51) Int. Cl.
  *G06F 11/00*    (2006.01)
  *G06F 11/263*   (2006.01)
  *G06N 20/00*    (2019.01)

(52) U.S. Cl.
  CPC .......... *G06F 11/263* (2013.01); *G06N 20/00* (2019.01)

(58) Field of Classification Search
  CPC .............. G06F 11/263; G06F 11/2257; G06F 11/2263; G06F 11/24; G06F 11/26; G06F 11/2635; G06F 11/273; G06F 11/2733; G06F 11/3664; G06F 11/3668; G06F 11/3672; G06F 11/3676; G06F 11/3684; G06F 11/3688; G06F 11/3692; G06N 20/00; G06N 20/10; G06N 20/20; G06N 5/025; G06N 7/023
  See application file for complete search history.

(56) References Cited

U.S. PATENT DOCUMENTS

| | | | |
|---|---|---|---|
| 5,214,746 A * | 5/1993 | Fogel ..................... | G06N 3/086 706/25 |
| 5,805,795 A | 9/1998 | Whitten | |
| 8,010,844 B2 * | 8/2011 | Lee ..................... | G06F 11/3684 714/38.1 |

(Continued)

FOREIGN PATENT DOCUMENTS

| | | |
|---|---|---|
| TW | 201734791 A | 10/2017 |
| TW | I617933 B | 3/2018 |

OTHER PUBLICATIONS

Office Action to the corresponding Taiwan Patent Application rendered by the Taiwan Intellectual Property Office (TIPO) dated Aug. 27, 2019, 9 pages (including English translation of summary).

*Primary Examiner* — Anthony J Amoroso
(74) *Attorney, Agent, or Firm* — Skaar Ulbrich Macari, P.A.

(57) ABSTRACT

A device for producing test data stores a plurality of simulated test data each of which substantially conforms to the data format accepted by a device under test (DUT). The data format includes different data blocks. The device for producing test data also mutates each of the simulated test data in one of a plurality of mutation forms to generate a plurality of first test data for testing the DUT. Each of the mutation forms refers to mutating one of the data blocks in one of a plurality of mutation ways.

10 Claims, 6 Drawing Sheets

(56) References Cited

U.S. PATENT DOCUMENTS

| | | | |
|---|---|---|---|
| 8,938,646 B2* | 1/2015 | Fournier | G06F 11/263 714/25 |
| 2017/0357911 A1 | 12/2017 | Liu et al. | |
| 2019/0163666 A1* | 5/2019 | Cakmak | G06N 5/04 |

* cited by examiner

DEVICE AND METHOD FOR PRODUCING TEST DATA

PRIORITY

This application claims priority to Taiwan Patent Application No. 107139177 filed on Nov. 5, 2018, which is hereby incorporated by reference in its entirety.

FIELD

The present disclosure relates to a device and a method for producing test data. More particularly, the present disclosure relates to a device and a method for producing test data that has been mutated in a variety of mutation forms.

BACKGROUND

Generally, the test data adopted in conventional automated software tests are automatically produced in a random manner or based on the test scripts written by test engineers. However, those randomly-produced test data are not all guaranteed to conform to the protocol/data format adopted/accepted by the device under test (hereinafter referred to as "DUT"), and therefore such way of producing test data may easily lead to a low test data validity with too many invalid test data. Besides, even if the randomly-produced test data are able to find some errors of the DUT, it may be difficult to trace the source of those errors. As for the test data produced based on test scripts, its content is vastly dependent on the subjective consciousness of the test engineers who written the test scripts, which may lead to some blind spots in the test data. As a result, it can be seen that the conventional methods for producing test data often causes that the testing efficiency and completeness of the conventional automated software tests are too insufficient to explore the relevance of the weak spots of the DUT and the test data. In view of this, it is very important to the technical field to improve the conventional method for producing test data, thereby improving the efficiency and completeness of the conventional automated software tests.

SUMMARY

Provided is a device for producing test data. The device for producing test data can comprise a storage and a processor electrically connected with the storage. The storage may be configured to store a plurality of simulated test data, wherein each of the plurality of simulated test data substantially conforms to a data format accepted by a DUT, and the data format comprises a plurality of data blocks that are different. The processor may be configured to mutate each of the plurality of simulated test data in one of a plurality of mutation forms to produce a plurality of first test data for testing the DUT, wherein each of the plurality of mutation forms refers to mutating one of the plurality of data blocks in one of a plurality of mutation ways.

Also provided is a method for producing test data. The method may comprise:

storing, by a device for producing test data, a plurality of simulated test data, wherein each of the plurality of simulated test data substantially conforms to a data format accepted by a DUT, and the data format comprises a plurality of data blocks that are different; and mutating, by the device for producing test data, each of the plurality of simulated test data in one of a plurality of mutation forms to produce a plurality of first test data for testing the DUT, wherein each of the plurality of mutation forms refers to mutating one of the plurality of data blocks in one of a plurality of mutation ways.

The validity of the test data produced by the provided device and method for producing test data is guaranteed since the test data conform to the data format accepted by the DUT. When the test data makes an error occurs, it is easy to trace the exact data block having the error and its data content because each of the test data is produced through mutating one of the data blocks therein. Furthermore, since the mutation forms adopted by the provided device and method for producing test data include two dimensions (i.e., the data block dimension and the mutation way dimension), the produced test data can enable an automated software test to test the DUT in a more complete and diverse way. Therefore, the device and method for producing test data effectively solve the above problems.

The aforesaid content is not intended to limit the present invention, but merely describes the technical problems that can be solved by the present invention, the technical means that can be adopted, and the technical effects that can be achieved, so that people having ordinary skill in the art can basically understand the present invention. People having ordinary skill in the art can understand the various embodiments of the present invention according to the attached figures and the content recited in the following embodiments.

DETAILED DESCRIPTION

The exemplary embodiments described below are not intended to limit the present invention to any specific example, embodiment, environment, applications, structures, processes or steps as described in these example embodiments.

In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

Figure 1:
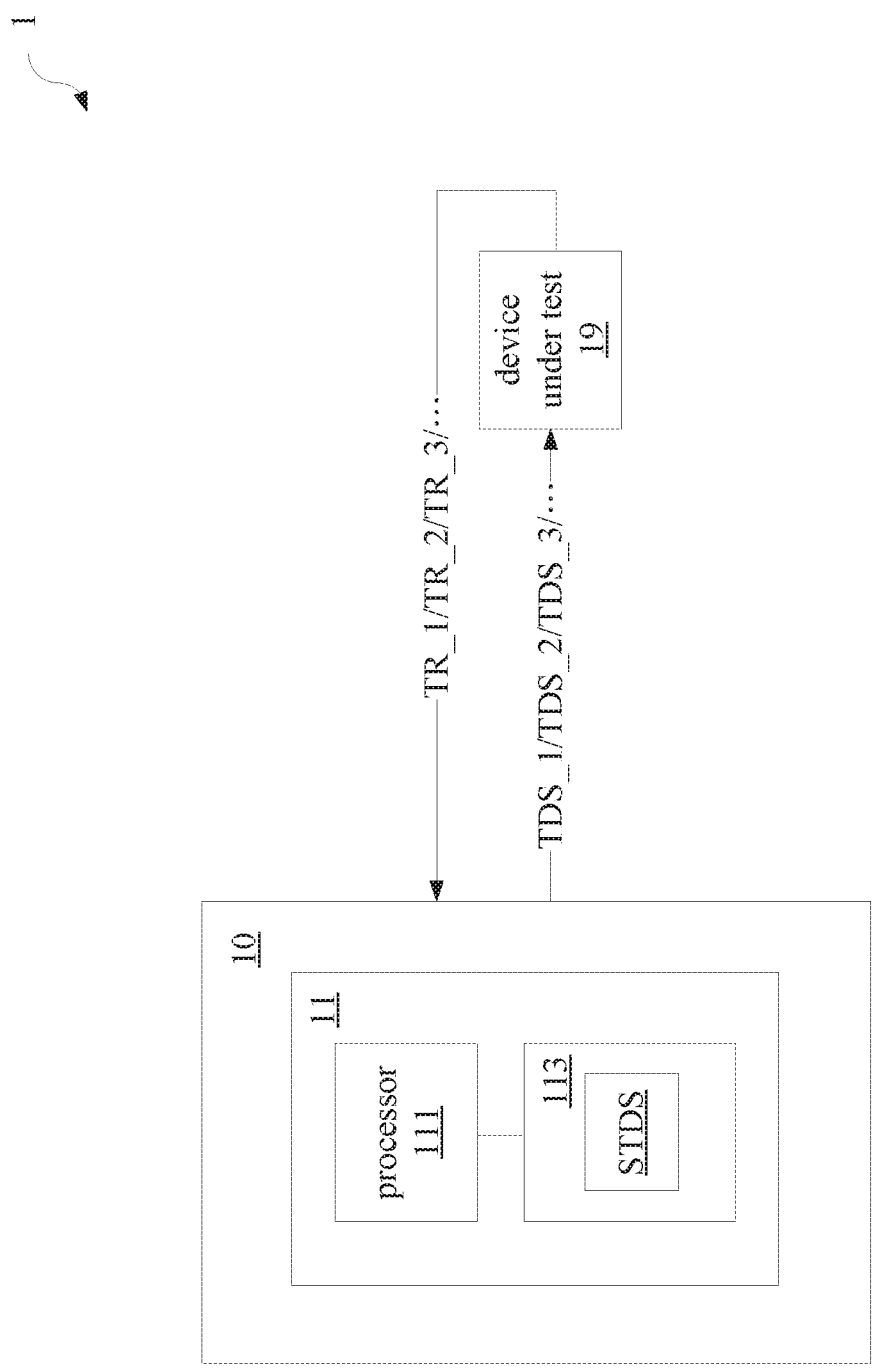
FIG. 1 illustrates a schematic view of a test system according to one or more embodiments of the present invention.

FIG. 1 illustrates a schematic view of a test system according to one or more embodiments of the present invention. The contents shown in FIG. 1 are merely for explaining the embodiments of the present invention instead of limiting the present invention.

Referring to FIG. 1, a test system 1 may comprise a testing device 10, a device 19 under test (hereinafter referred to as "DUT 19" unless described otherwise), and a device 11 for producing test data (hereinafter referred to as "device 11" unless described otherwise). The device 11 may be configured to produce test data, and the testing device 10 may use the test data to test the device 19. The device 11 may basically comprise a processor 111 and a storage 113 electrically connected to the processor 111. In some embodiments, the device 11 may be disposed in the testing device 10 and share the processor 111 and the storage 113 with the testing device 10. In some embodiments, the device 11 may be disposed outside of the testing device 10, and the device 11 may be connected to the testing device 10 in a wired or a wireless manner. In some embodiments, the testing device 10 may be disposed within the DUT 19. In some embodiments, the testing device 10 may also be disposed outside of the device 19 and connected thereto in a wired or a wireless manner.

The storage 113 may be configured to store data produced by the device 11 or data received from the outside. The memory 113 may comprise a first level memory (also referred to as main memory or internal memory), and the processor 111 may directly read the instruction set stored in the first level memory and execute the instruction sets as needed. The storage unit 113 may optionally comprise a second level memory (also referred to as an external memory or a secondary memory), and the memory may transmit the stored data to the first level memory through the data buffer. For example, the second level memory may be, but not limited to, a hard disk, a compact disk, or the like. The storage device 113 may optionally comprise a third level memory, that is, a storage device that may be directly inserted or removed from a computer, such as a portable hard disk.

The processor 111 may be a microprocessor or a microcontroller having a signal processing function. A microprocessor or microcontroller is a programmable special integrated circuit that has the functions of operation, storage, output/input, etc., and can accept and process various coding instructions, thereby performing various logic operations and arithmetic operations, and outputting the corresponding operation result. The processor 111 may be programmed to execute various operations or programs in the device 11.

The storage 113 may store a plurality of simulated test data produced by the processor 111. For ease of explanation, the plurality of simulated test data will be represented by a simulation test data set STDS hereinafter. The processor 111 may produce a first test data set TDS_1 comprising a plurality of first test data based on the simulated test data set STDS. The testing device 10 may test the device 19 with the first test data set TDS_1 and thereby obtain a test result TR_1. The processor 111 may produce a second test data set TDS_2 based on the simulated test data set STDS again according to the test result TR_1, and the testing device 10 may test the device 19 again with the second test data set TDS_2, and thereby obtain a test result TR_2. The processor 111 may generate a third test data set TDS_3 based on the simulated test data set STDS again according to the test result TR_2, and the testing device 10 may test the device 19 again with the third test data set TDS_3, and thereby obtain a test result TR_3. The same process may be repeated until a termination condition is met.

Figure 2A:
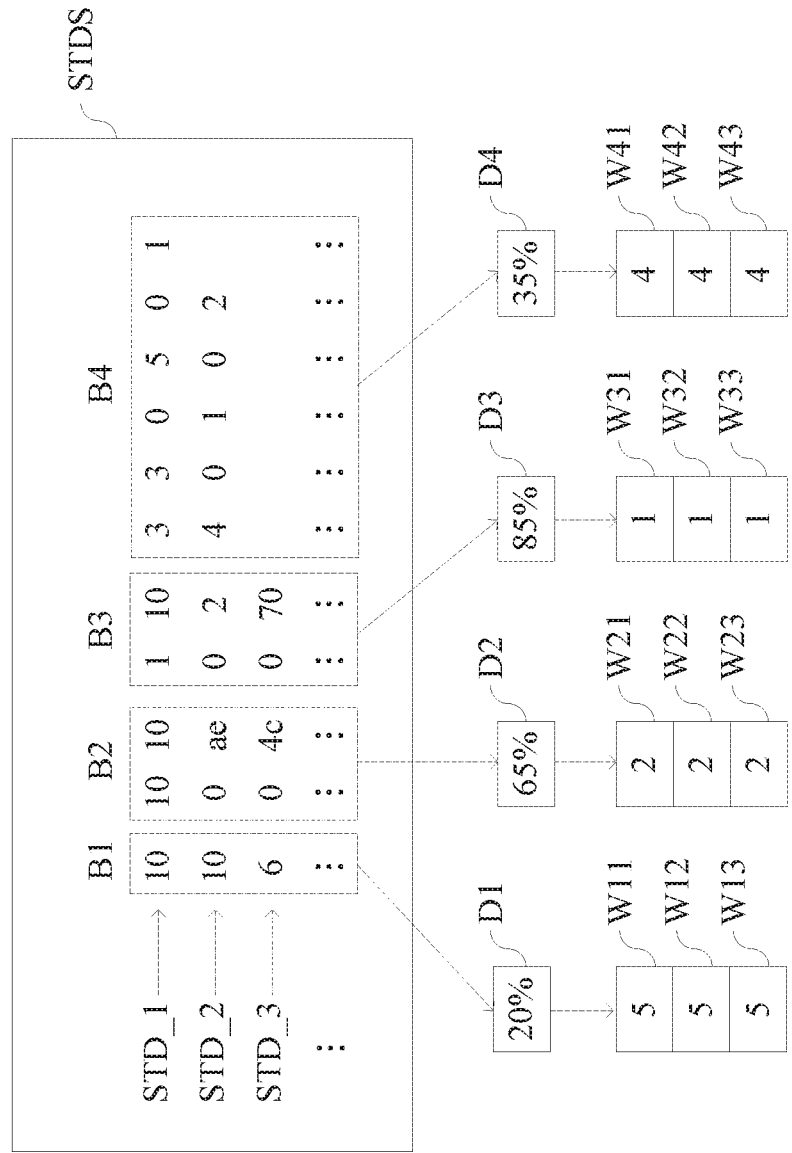
FIG. 2A illustrates a schematic view of the correlation between the data variation rates corresponding to a plurality of data blocks of a plurality of simulated test data and the weight values of a plurality of mutation forms according to one or more embodiments of the present invention.
Figure 2B:
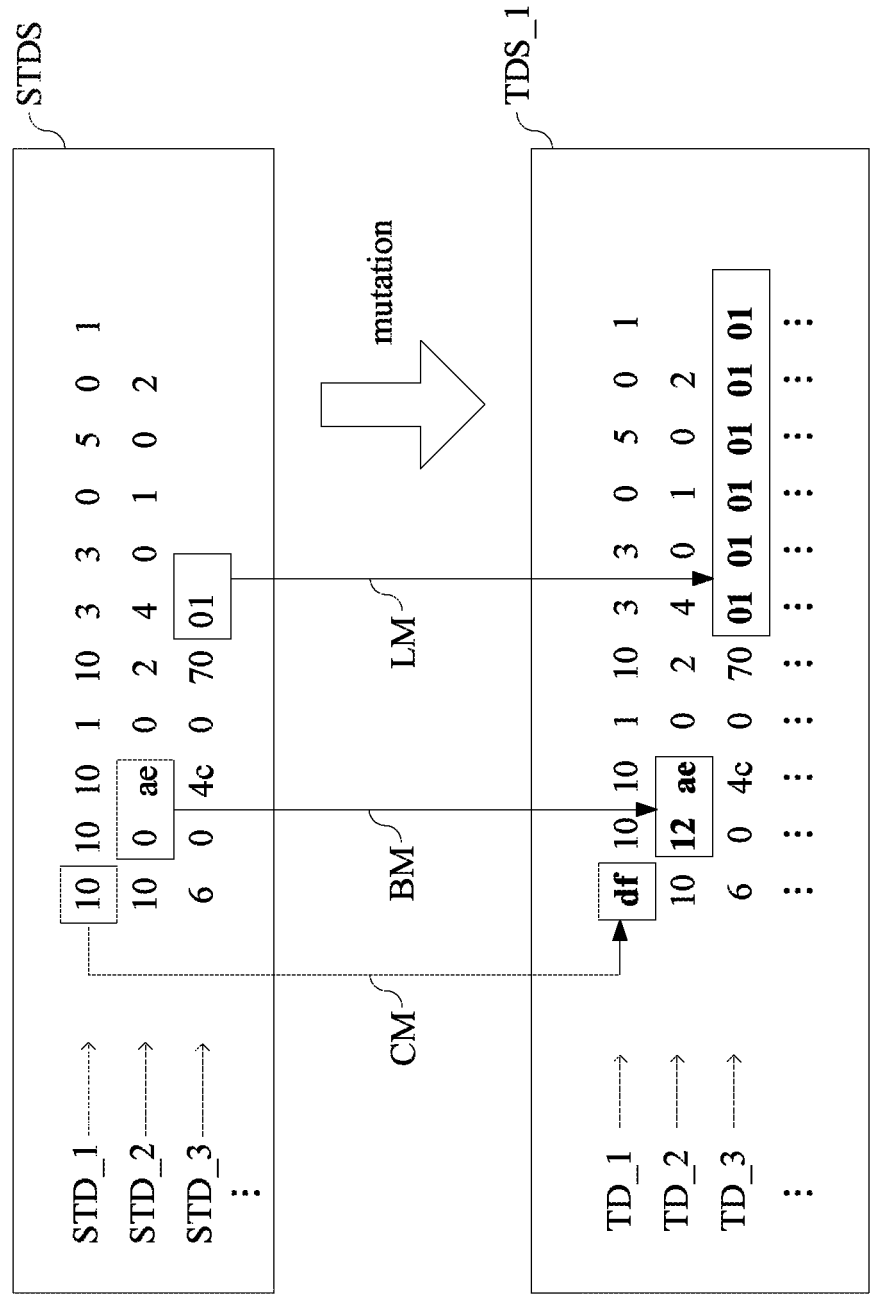
FIG. 2B illustrates a schematic view of mutating the simulated test data in a plurality of mutation forms according to one or more embodiments of the present invention.

FIG. 2A illustrates a schematic view of the correlation between the data variation rates corresponding to a plurality of data blocks of a plurality of simulated test data and the weight values of a plurality of mutation forms according to one or more embodiments of the present invention, and FIG. 2B illustrates a schematic view of mutating the simulated test data in a plurality of mutation forms according to one or more embodiments of the present invention. The contents shown in FIG. 2A and FIG. 2B are merely for explaining the embodiments of the present invention instead of limiting the present invention.

Referring to FIG. 1, FIG. 2A and FIG. 2B together, the simulated test data set STDS may comprise a plurality of test data, such as simulated test data STD_1, simulated test data STD_2, and simulated test data STD_3. Each simulated test data in the simulated test data set STDS substantially conforms to a data format accepted by the device 19, and the data format comprises data blocks that are different. For example, if the protocol adopted by the device 19 is the Message Queuing Telemetry Transport (MQTT) protocol, the data format may comprise the data blocks such as "header", "payload length", "topic length", "topic name", "message ID", and "message content" or the like. In order to simplify the description, it is assumed that the data format corresponding to each test data in the simulated test data set STDS comprises a data block B1, a data block B2, a data block B3, and a data block B4.

The processor 111 may analyze the degree of data variation of each of the data blocks in the simulated test data set STDS to calculate a data variation rate for each of the data blocks. For example, a data variation rate D1 corresponding to the data block B1, a data variation rate D2 corresponding to the data block B2, a data variation rate D3 corresponding to the data block B3, and a data variation rate D4 corresponding to the data block B4 are presented.

Taking three simulated test data, i.e., the simulated test data STD_1, the simulated test data STD_2, and the simulated test data STD_3 as an example, the processor 111 may discover, based on the data content (i.e., "10", "10" and "6") in the data block B1, that there are two kinds of values existing in the three pieces of data in the data block B1, and therefore calculate the data variation rate corresponding to the data block B1 as "⅔" (i.e., "67%"). According to such rule, for example, the processor 111 may calculate the data variation rate D1 of the data block B1, the data variation rate D2 of the data block B2, the data variation rate D3 of the data block B3, and the data variation rate D4 of the data block B4 as "20%", "65%", "85%" and "35%" respectively.

The manner in which the above data variation rates are calculated is only an aspect of the various embodiments of the present invention, and is not a limitation. For example, in some embodiments, the processor 111 may also calculate the data variation rate D1, the data variation rate D2, the data variation rate D3, and the data variation rate D4 by various known longest common subsequence (LCS) algorithms which estimate the data similarity of each data block by calculate LCS of any two pieces of data arbitrarily selected from the data block. The LCS algorithms may be, for example but not limited to, the Needleman-Wunsch algorithm, the Smith-Waterman algorithm, or the Hirschberg's algorithm, etc.

The processor 111 may use a plurality mutation forms to mutate each simulated test data in the simulated test data set STDS to produce a first test data set TDS_1 comprising a plurality of first test data. The plurality of variation forms refer to as mutating the content of the simulated test data corresponding to one of the plurality of data blocks in one of a plurality of mutation ways, wherein the plurality of mutation ways may comprise, for example, at least a bit mutation BM, a character mutation CM, and a length mutation LM. For ease of description, the processor 111 performing the bit mutation BM, the character mutation CM and the length mutation LM to the data content of the data block B1 represent a mutation form M11, a mutation form M12 and a mutation form M13 (not shown in the drawings) respectively. Similarly, the processor 111 performing the bit mutation BM, the character mutation CM and the length mutation LM to the data content of the data block B2 represent a mutation form M21, a mutation form M22 and a mutation form M23 (not shown in the drawings) respectively, and the processor 111 performing the bit mutation BM, the character mutation CM and the length mutation LM to the data content of the data block B3 represent a mutation form M31, a mutation form M32 and a mutation form M33 (not shown in the drawings) respectively. Also, the processor 111 performing the bit mutation BM, the character mutation CM and the length mutation LM to the data content of the data block B4 represent a mutation form M41, a mutation form M42 and a mutation form M43 (not shown in the drawings) respectively.

In some embodiments, each of the plurality of mutation forms may have a corresponding weight value, and the processor 111 may mutate each simulated test data in one of the mutation forms based on the weight values of the mutation forms. Since each of the plurality of mutation forms corresponds to one of the plurality of data blocks in the simulated test data set STDS, after calculating the data variation rates of the plurality of data blocks, the processor 111 may determine a weight value for each of the mutation forms corresponding to one of the data block according to the data variation rate of the corresponding data block. For ease of description, the weight values of the mutation form M10, the mutation form M12 and the mutation form M13 will be represented as a weight value W11, a weight value W12 and a weight value W13 respectively, and the weight values of the mutation form M21, the mutation form M22 and the mutation form M23 will be represented as a weight value W21, a weight value W22 and a weight value W23 respectively. Moreover, the weight values of the mutation form M31, the mutation form M32 and the mutation form M33 will be represented as a weight value W31, a weight value W32 and a weight value W33 respectively, and the weight values of the mutation form M41, the mutation form M42 and the mutation form M43 will be represented as a weight value W41, a weight value W42 and a weight value W43 respectively.

Since the lower the data variation rate of a data block, the lower the degree of variation of the test data in the data block, it may be expected that the test data produced with more mutations to the data block can cause more error messages as the testing device 10 uses the test data to test the DUT 19. In view of this, in some embodiments, the weight values of the mutation forms corresponding to the same data block and the data variation rate corresponding to the data block in the plurality of simulated test data may be inversely correlated. That is, a mutation form corresponding to a data block having a lower data variation rate may have a larger weight value.

For example, since the data variation rate D1 of the data block B1 is the lowest among the data variation rates D1-D4, the processor 111 may set all of the weight value W11, W12 and W13 of the mutation forms M11, M12 and M13 corresponding to the data block B1 to five, which is the largest among the four data blocks B1-B4. The processor 111 may set all of the weight values W41, W42 and W43 of the mutation forms M41, M42 and M43 corresponding to the data block B4 that has the second lowest data change rate D4 to four. The processor 111 may set the weight values W21, W22 and W23 of the mutation forms M21, M22 and M23 corresponding to the data block B2 that has the third lowest data variation rate D2 to two. The processor 111 may set the weight values W31, W32 and W33 of the mutation forms M31, M32 and M33 corresponding to the data block B3 that has the highest data variation rate D3 to one.

After determining the weight values of the plurality of mutation forms, the processor 111 may mutate each of the plurality of simulated test data in one mutation form selected randomly from the plurality of mutation forms based on the plurality of weight values. The higher the weight value, the higher the probability that the mutation form is selected by the processor 111. For example, as shown in FIG. 2B, the processor 111 may mutate the simulated test data STD_1 in the simulated test data set STDS according to the mutation form M12 (i.e., performing the character mutation CM to the data block B1). That is, the processor 111 produce the first test data TD_1 by mutating the data content "10" corresponding to the data block B1 in the simulated test data STD_1 to "df". Furthermore, as shown in FIG. 2B, the processor 111 may mutate the simulated test data STD_2 in the simulated test data set STDS according to the mutation form M21 (i.e., performing the bit mutation LM to the data block B2). That is, the processor 111 produce the first test data TD_2 by mutating the data content "0 ae" corresponding to the data block B2 in the simulated test data STD_2 to "12 ae". In addition, as shown in FIG. 2B, the processor 111 may mutate the simulated test data STD_3 in the simulated test data set STDS according to the mutation form M43 (i.e., performing the length mutation LM to the data block B4). That is, the processor 111 produce the first test data TD_3 by mutating the data content "01" corresponding to the data block B4 in the simulated test data STD_3 to "01 01 01 01 01 01". Similarly, the processor 111 may subsequently mutate the other simulated test data in the simulated test data set STDS to form a first test data set TDS_1.

The testing device 10 may use the first test data set TDS_1 to test the DUT 19, and accordingly obtain the test result TR_1. In some embodiments, the test result TR_1 may record the respective number of the first test data in the first test data set TDS_1 causing each of the various types of error of the DUT 19, and since each of the first test data corresponds to a mutation form that it has experienced, the test result TR_1 may also record the respective number of the mutation forms causing each of the various types of error, as shown in Table

TABLE 1

| Mutation Form | Quantity |
|---|---|
| Error type: Processing error | |
| M11 | 50 |
| M23 | 13 |
| M13 | 9 |
| Error type: Long response time | |
| M12 | 70 |
| M24 | 7 |

The processor 111 may adjust the weight values of the plurality of mutation forms according to the test result TR_1 and randomly select one of the plurality of mutation forms for each simulated test data in the simulated test data set STDS according to the adjusted weight values, and then mutate, in the corresponding mutation form, each simulated test data in the simulated test data set STDS to produce a second test data set TDS_2 comprising a plurality of second test data. After that, the testing device 10 may test the DUT 19 again based on the plurality of second test data.

For example, it can be seen from Table (1) that the number of the first test data derived from mutating the simulated test data in the mutation form M11 is the largest among the first test data causing "processing errors" of the DUT 19. As for the first test data causing the "long response time" error of the DUT 19, the number of the first test data obtained by mutating the simulated test data in the mutation form M12 is the largest. This result implies that the mutation form M11 (i.e., performing bit mutation BM to the data block B1) is prone to cause the "processing error" error of the DUT 19, and that the mutation form M12 (i.e., performing character mutation CM to the data block B2) is prone to cause the "long response time" error of the DUT 19. In view of this, if the user wants to perform a deeper test on the error type of the "processing error", the processor 111 may adjust the weight value W11 of the mutation form M11 from five to ten according to the test result TR_1, which means that more simulated test data will be probably selected to be mutated in the mutation form M11 without changing the number of the simulated test data as compared to the previous round of mutation. Similarly, if the user wants to perform a deeper test on the error type of the "long response time", the processor 111 may adjust the weight value W12 of the mutation form M12 from five to fifteen according to the test result TR_1, which means that more simulated test data will be probably selected to be mutated in the mutation form M12 without changing the number of simulated test data as compared to the previous round of mutation.

In some embodiments, the storage 113 may store a preset test data set comprising a plurality of preset test data, wherein the plurality of preset test data conform to the data format accepted by the DUT 19 (yet the device 11 does not know the data format). Under such circumstances, the processor 111 may analyze and learn, through a machine learning algorithm, the mode of communicating with the DUT 19 according to the preset test data set, so as to know the data format accepted by the DUT 19, and then produce the plurality of simulated test data in the simulated test data set STDS based on the data format. As a result, each of the simulated test data in the simulated test data set STDS substantially conforms to the data format accepted by the DUT 19. For example, the processor 111 may train a model about the protocol used by the DUT 19 (i.e., learning the mode of communicating with the DUT 19) based on the plurality of preset test data thorough various deep learning algorithms, such as Long Short-Term Memory (LSTM), Recurrent Neural Network (RNN), and Deep Neural Network (DNN) or the like, and then produce the plurality of simulated test data substantially conforming to the data format accepted by the DUT 19 based on the model. The advantage of the above way for producing the simulated test data is that the processor 111 may learn the mode of communicating with the DUT 19 by means of machine learning as long as a plurality of preset test data conforming to the data format accepted by the DUT 19 is provided thereto, and thus producing the simulated test data substantially conforming to the data format accepted by the DUT 19 without knowing the protocol adopted by the DUT 19. Therefore, the above way for producing the simulated test data is not limited to the DUT 19 that adopts one specific protocol.

Figure 3A:
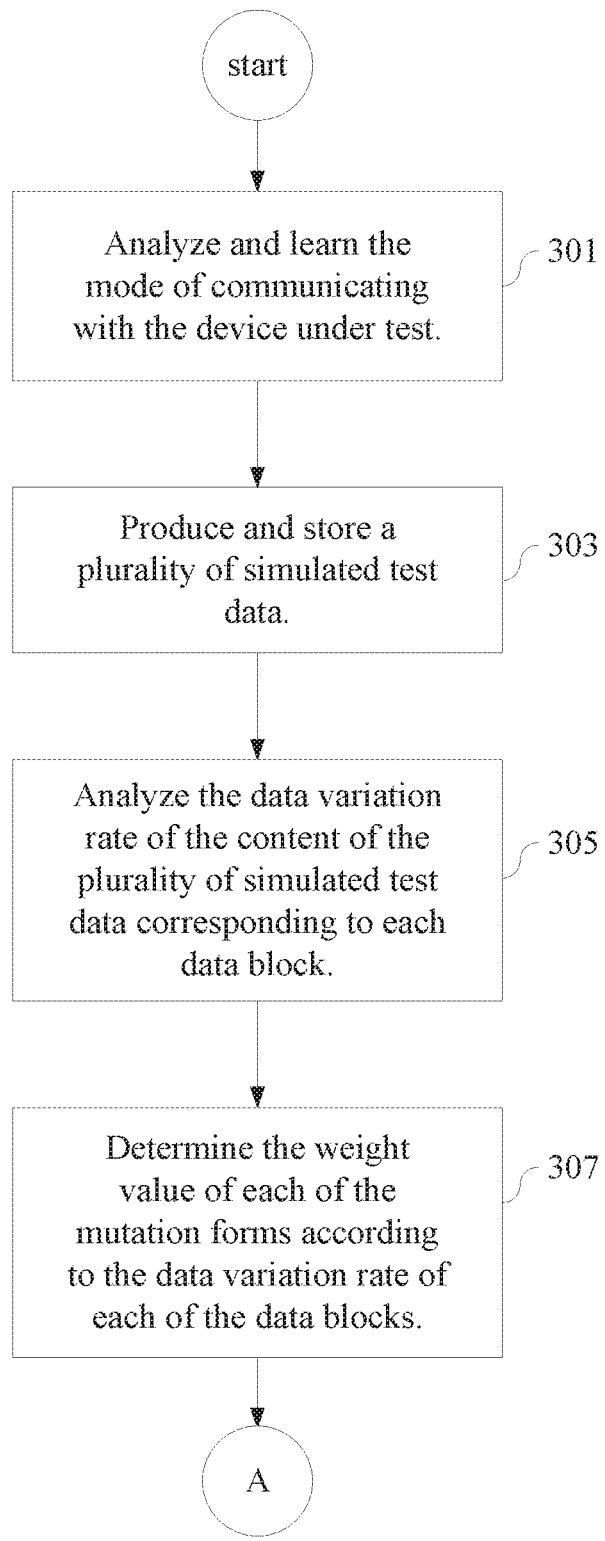
FIGS. 3A-3B illustrates schematic views of how the test system in FIG. 1 operates according to one or more embodiments of the present invention.
Figure 3B:
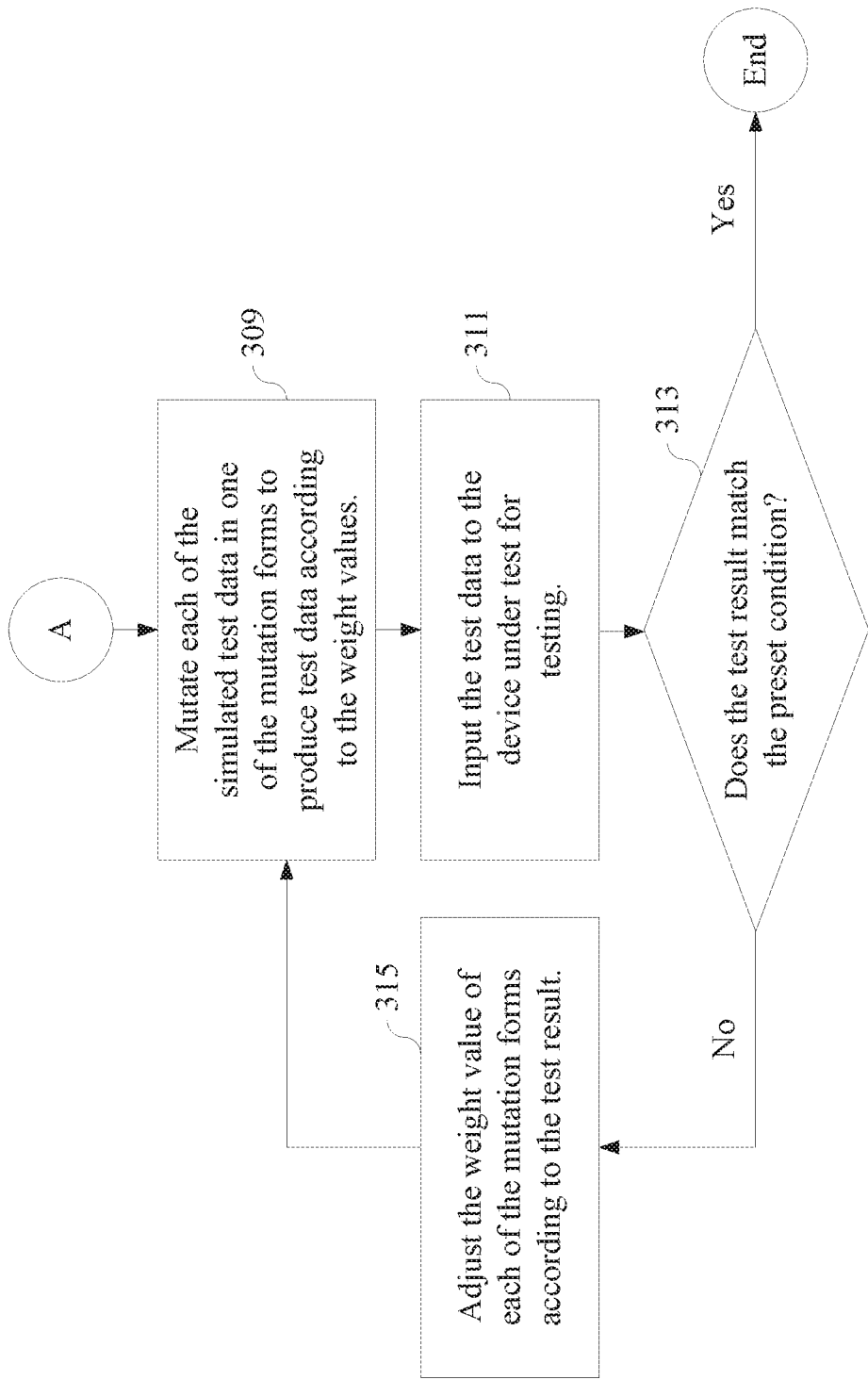

FIGS. 3A-3B illustrates schematic views of how the test system in FIG. 1 operates according to one or more embodiments of the present invention. The contents shown in FIGS. 3A-3B are merely for explaining the embodiments of the present invention instead of limiting the present invention.

As shown in FIG. 3A, the device 11 may first analyze and learn (e.g., through a deep learning algorithm related to machine learning) the mode of communicating with the DUT 19 (marked as action 301), and then produce and store a plurality of simulated test data (marked as action 303), wherein each of the plurality of simulated test data substantially conforms to a data format accepted by the DUT 19, and the data format comprises a plurality of data blocks that are different. After that, the device 11 may analyze the data variation rate of the content of the plurality of simulated test data corresponding to each data block (marked as action 305), and then determine the weight values of a plurality of mutation forms according to the plurality of variation rates of the plurality of data blocks (marked as action 307), wherein each of the plurality of mutation forms refers to mutating the data content corresponding to one of the plurality of data blocks in one of a plurality of mutation ways, and the plurality of mutation ways may comprise at least a bit mutation, a character mutation and a length mutation.

As shown in FIG. 3B, the device 11 may mutate each of the plurality of simulated test data in one mutation form selected randomly from the plurality of mutation forms according to the weight values of the plurality of mutation forms so as to produce a plurality of test data (marked as action 309). Subsequently, the testing device 10 may input the plurality of test data to the DUT 19 for testing (marked as action 311) to obtain a test result. Next, the testing device 10 may determine whether the test result satisfies a preset condition (marked as action 313). If the determination result is positive, the process of producing and testing the test data may be terminated; and if the determination result is negative, the device 11 may adjust the weight values of the plurality of mutation forms according to the test result (marked as action 315). After the device 11 adjusts the weight values of the plurality of mutation forms, the action 309, the action 311, and the action 313 may be performed again in sequence until the test result satisfies the preset condition.

For example, the preset condition may be, but not limited to, a percentage of the total amount of test data causing a certain type of error of the DUT 19 to be less than a predetermined threshold, such as one percent. Alternatively, the preset condition may be that the number of tests reaches a certain threshold, for example, one hundred times.

Figure 4:
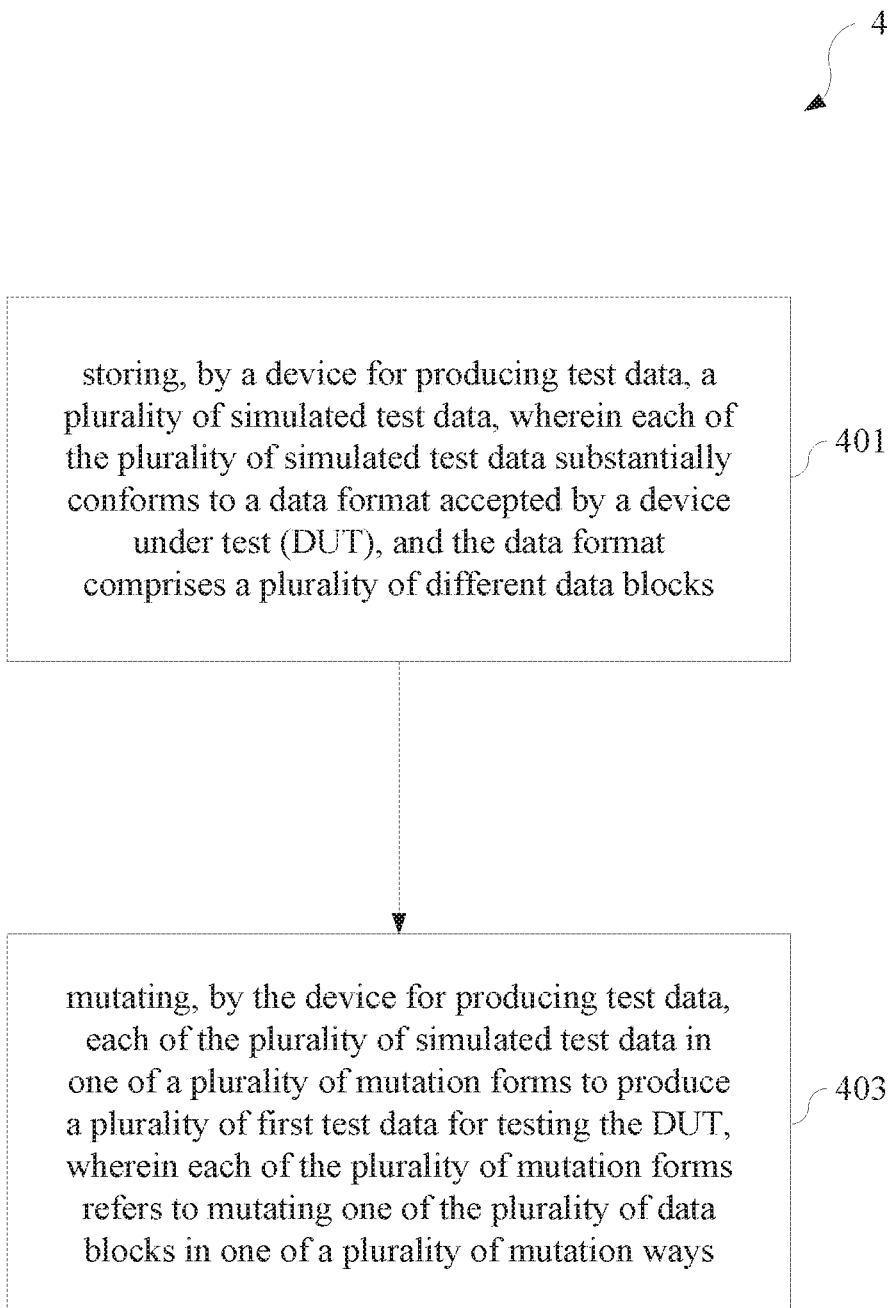
FIG. 4 illustrates a schematic view of a method for producing test data according to one or more embodiments of the present invention.

FIG. 4 illustrates a schematic view of a method for producing test data according to one or more embodiments of the present invention. The contents shown in FIG. 4 are merely for explaining the embodiments of the present invention instead of limiting the present invention.

Referring to FIG. 4, a method 4 of producing test data may comprise:

storing, by a device for producing test data, a plurality of simulated test data, wherein each of the plurality of simulated test data substantially conforms to a data format accepted by a device under test (DUT), and the data format comprises a plurality of data blocks that are different (marked as step 401); and mutating, by the device for producing test data, each of the plurality of simulated test data in one of a plurality of mutation forms to produce a plurality of first test data for testing the DUT, wherein each of the plurality of mutation forms refers to mutating one of the plurality of data blocks in one of a plurality of mutation ways (marked as step 403).

In some embodiments, the plurality of mutation ways may comprise at least a bit mutation, a character mutation and a length mutation.

In some embodiments, besides the step 401 and the step 403, the method 4 for producing test data may further comprise: learning, by the device for producing test data, a mode of communicating with the DUT to obtain the data format accepted by the DUT; and producing, by the device for producing test data, the plurality of simulated test data based on the data format. Moreover, it is optional that the device for producing test data may learn the mode of communicating with the DUT with a machine learning algorithm.

In some embodiments, besides the step 401 and the step 403, the method 4 for producing test data may further comprise: determining, by the device for producing test data, a weight value for each of the plurality of mutation forms, wherein weight values of mutation forms corresponding to the same data block are related to a data variation rate of simulated test data of the data block; and mutating, by the device for producing test data, each of the plurality of simulated test data in one of the plurality of mutation forms randomly decided based on the plurality of weight values to produce the plurality of first test data. Moreover, it is optional that weight values of mutation forms corresponding to the same data block and a data variation rate of simulated test data of the data block may be inversely correlated.

In some embodiments, besides the step 401 and the step 403, the method 4 for producing test data may further comprise: determining, by the device for producing test data, a weight value for each of the plurality of mutation forms, wherein weight values of mutation forms corresponding to the same data block are related to a data variation rate of simulated test data of the data block; mutating, by the device for producing test data, each of the plurality of simulated test data in one of the plurality of mutation forms randomly decided based on the plurality of weight values to produce the plurality of first test data; adjusting, by the device for producing test data, the plurality of weight values of the plurality of mutation forms according to test results produced by the plurality of first test data; and mutating, by the device for producing test data, each of the plurality of simulated test data in one of the plurality of mutation forms randomly decided based on the plurality of adjusted weight values to produce a plurality of second test data for testing the DUT.

In addition to the aforesaid steps, in some embodiments, the method 4 of producing test data may further comprise other steps corresponding to the operations of the device 11 for producing test data as mentioned above. These steps which are not mentioned specifically can be directly understood by people having ordinary skill in the art based on the aforesaid descriptions for the device 11 for producing test data, and will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A device for producing test data, comprising:
a storage, configured to store a plurality of simulated test data, wherein each of the plurality of simulated test data substantially conforms to a data format accepted by a device under test (DUT), and the data format comprises a plurality of different data blocks; and
a processor electrically connected with the storage, configured to:
determine a weight value for each of a plurality of mutation forms, wherein weight values of mutation forms corresponding to the same data block and a data variation rate of simulated test data of the data block are inversely correlated; and
mutate each of the plurality of simulated test data in one of a plurality of mutation forms randomly decided based on the plurality of weight values to produce a plurality of first test data for testing the DUT, wherein each of the plurality of mutation forms refers to mutating one of the plurality of data blocks in one of a plurality of mutation ways.

2. The device for producing test data of claim 1, wherein the plurality of mutation ways comprise at least a bit mutation, a character mutation and a length mutation.

3. The device for producing test data of claim 1, wherein the processor is further configured to:
learn a mode of communicating with the DUT to obtain the data format accepted by the DUT; and
produce the plurality of simulated test data based on the data format.

4. The device for producing test data of claim 3, wherein the processor learns the mode of communicating with the DUT with a machine learning algorithm.

5. The device for producing test data of claim 1, wherein the processor is further configured to adjust the plurality of weight values of the plurality of mutation forms according to test result produced by the plurality of first test data, and mutate each of the plurality of simulated test data in one of the plurality of mutation forms randomly decided based on the plurality of adjusted weight values to produce a plurality of second test data for testing the DUT.

6. A method for producing test data, comprising:
determining, by a device for producing test data, a weight value for each of the plurality of mutation forms, wherein weight values of mutation forms corresponding to the same data block and a data variation rate of simulated test data of the data block are inversely correlated; and
storing, by the device for producing test data, a plurality of simulated test data, wherein each of the plurality of simulated test data substantially conforms to a data format accepted by a device under test (DUT), and the data format comprises a plurality of different data blocks; and
mutating, by the device for producing test data, each of the plurality of simulated test data in one of a plurality of mutation forms randomly decided based on the plurality of weight values to produce a plurality of first test data for testing the DUT, wherein each of the plurality of mutation forms refers to mutating one of the plurality of data blocks in one of a plurality of mutation ways.

7. The method for producing test data of claim 6, wherein the plurality of mutation ways comprise at least a bit mutation, a character mutation and a length mutation.

8. The method for producing test data of claim 6, further comprising:
- learning, by the device for producing test data, a mode of communicating with the DUT to obtain the data format accepted by the DUT; and
- producing, by the device for producing test data, the plurality of simulated test data based on the data format.

9. The method for producing test data of claim 8, wherein the device for producing test data learns the mode of communicating with the DUT with a machine learning algorithm.

10. The method for producing test data of claim 6, further comprising:
- adjusting, by the device for producing test data, the plurality of weight values of the plurality of mutation forms according to test results produced by the plurality of first test data; and
- mutating, by the device for producing test data, each of the plurality of simulated test data in one of the plurality of mutation forms randomly decided based on the plurality of adjusted weight values to produce a plurality of second test data for testing the DUT.

* * * * *